C. F. DAVIS.
CULTIVATOR.
APPLICATION FILED JULY 5, 1913.

1,104,636.

Patented July 21, 1914.
3 SHEETS—SHEET 1.

WITNESSES
L. H. Schmidt.
C. E. Trainor

INVENTOR
CHARLIE F. DAVIS,
BY Munn & Co.
ATTORNEYS

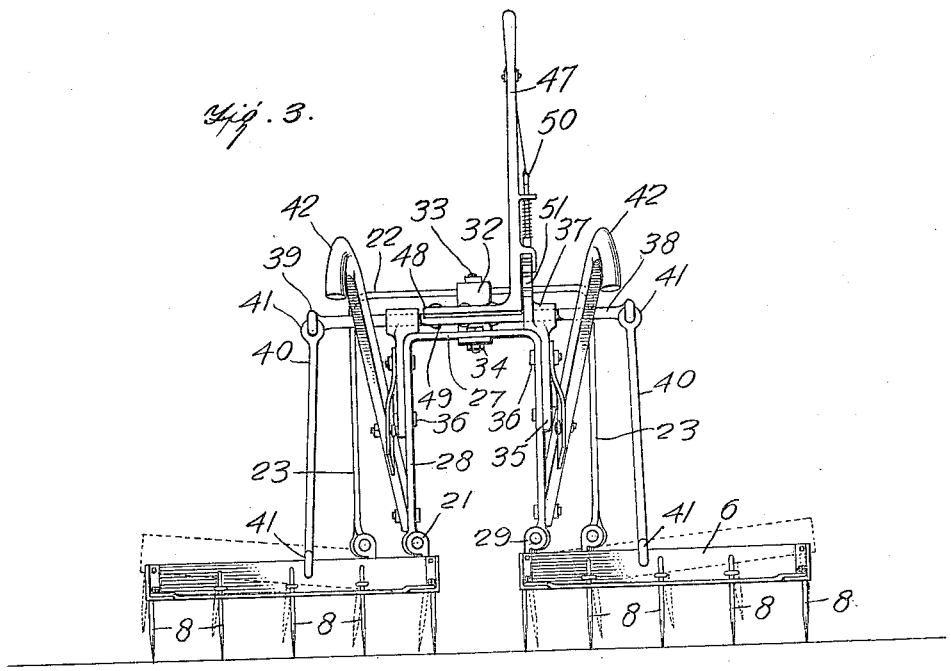

C. F. DAVIS.
CULTIVATOR.
APPLICATION FILED JULY 5, 1913.
1,104,636.
Patented July 21, 1914.
3 SHEETS—SHEET 3.
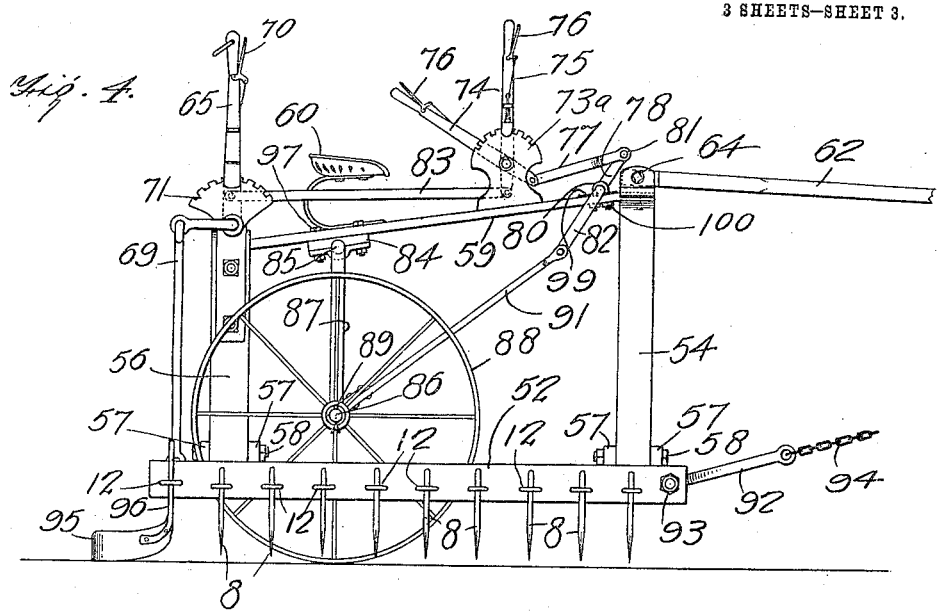
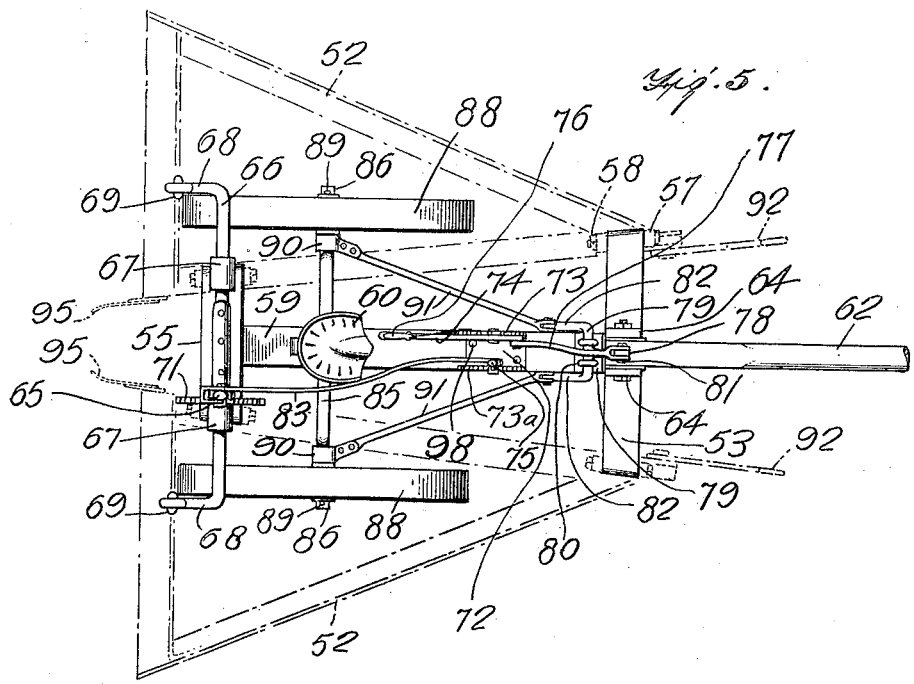
WITNESSES
INVENTOR
CHARLIE F. DAVIS,
BY
ATTORNEYS

UNITED STATES PATENT OFFICE.

CHARLIE F. DAVIS, OF SHAWNEE, OKLAHOMA.

CULTIVATOR.

1,104,636.  Specification of Letters Patent.  Patented July 21, 1914.

Application filed July 5, 1913. Serial No. 777,521.

*To all whom it may concern:*

Be it known that I, CHARLIE F. DAVIS, a citizen of the United States, and a resident of Shawnee and State of Oklahoma, have made certain new and useful Improvements in Cultivators, of which the following is a specification.

My invention is an improvement in cultivators, and has for its object to provide a combined harrow and cultivator, especially adapted for cultivating small plants, such as cotton, corn and the like, wherein mechanism is provided for quickly adjusting the cultivating mechanism to the plants, whether the said plant is on a ridge or on the level or in the furrow.

Figure 1:
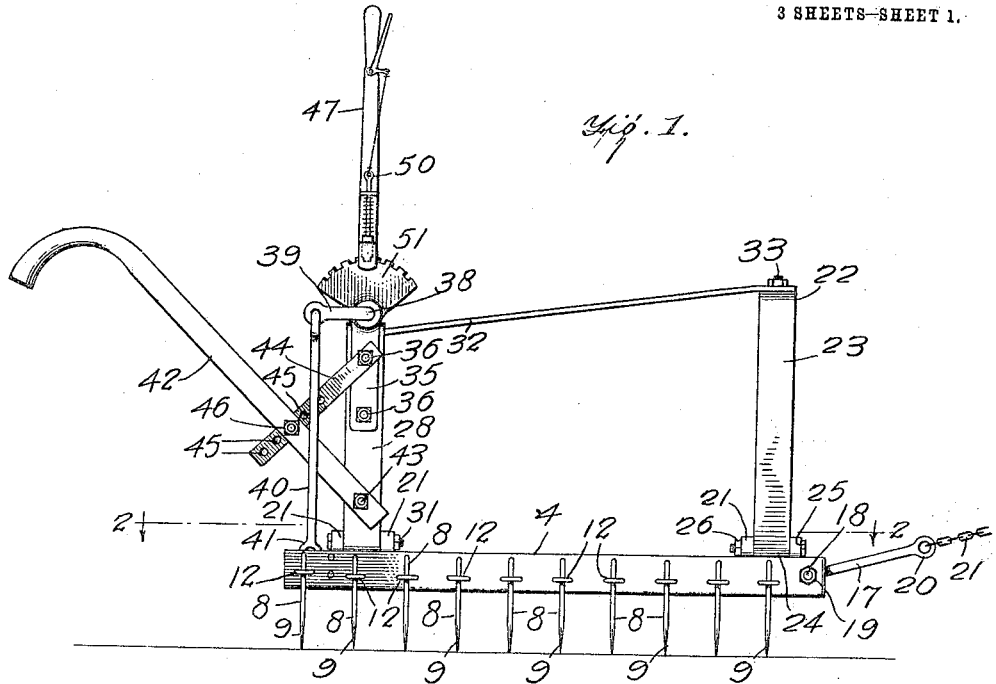

In the drawings: Figure 1 is a side view of the improved cultivator, Fig. 2 is a section on the line 2—2 of Fig. 1, Fig. 3 is a rear view, Fig. 4 is a side view of a wheeled or sulky cultivator, and, Fig. 5 is a top plan view of the same with the cultivating mechanism in dotted lines.

Figure 2:
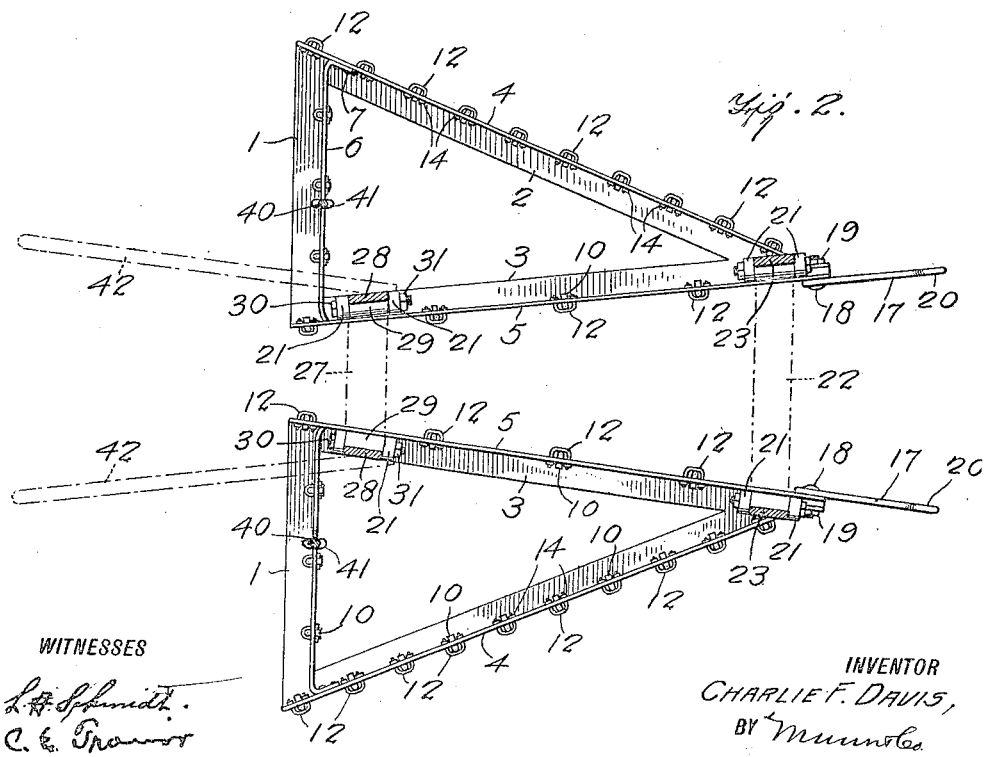

The embodiment of the invention shown in Figs. 1 to 3 comprises a plurality of triangular frames, each comprising a base 1 and sides 2 and 3. Each of the sides 2 and 3 is provided at its outer side edge with a lateral upstanding flange 4 and 5 respectively, and the base 1 is provided with a similar flange 6 at its inner side edge.

That end of the flange 6 adjacent to the flange 4 of the side 2 is lapped upon the said flange 4, as indicated at 7, and secured thereto by rivets or the like. The opposite end of the flange is abutted against the flange 5. A series of cultivating or harrow teeth is connected with each side of the frame and with the base in spaced relation, each of the said teeth 8 having one end pointed, as shown at 9, and having at the other end a lateral lug 10.

At the three sides of the frames, the teeth 8, are arranged on the outer faces of the flanges 4, 5 and 6 and are held to the respective flanges by means of substantially U-shaped clips 12. The flanges are provided with openings for receiving the lugs 10.

A draft bar 17 is connected with each frame, each of the said bars having at its inner end an opening through which is passed a bolt 18, and the said bolt is engaged by a nut 19 to prevent disengagement thereof. The inner end of each of the draft bars is lapped on the inner face of the flange 5 of the side 3, and each draft bar is provided at its outer end with an eye 20 for engagement by draft apparatus 21, as shown in Fig. 1.

The flange 5 of the side 3 of each flange is provided near each end with a pair of laterally spaced bearing lugs 21, and an arch bar comprising a body 22 and arms 23 connects the frames at their apices, each of the arms of the arch bar having a bearing 24 received between the adjacent pair of lugs 21, and the bolt 25 is passed through the lugs and the bearing and is engaged by a nut 26 to connect the said arm to the adjacent frame. The body 22 of the arch bar extends transversely of the frames, and a similar arch bar of smaller size connects the frames at their rear end. The said arch bar comprises a body 27 and arms 28, each arm having a bearing 29 at its lower end, and each of the said bearings is received between a pair of lugs 21. A bolt 30 is passed through each pair of lugs and the adjacent bearing 29, and each bolt is engaged by a nut 31 to hold it in place. The body 27 of the arch bar extends transversely of the frames, and the two arch bars are connected by a plate 32. The front end of the said plate is lapped on the upper face of the body 22 of the front arch bar, and is secured thereto by a bolt and nut 33. The rear end of the plate is lapped on the under face of the body 27 of the rear arch bar, and is secured thereto by a bolt and nut 34. A bearing bracket 35 is secured to the outer face of each arm 28 of the rear arch bar, near the upper ends of the arm, by means of bolts and nuts 36, and the bearings 37 of the said arms are in alinement. A shaft 38 is journaled in the bearings, and each end of the said shaft is provided with a crank arm 39, each of the said arms having an eye at its free end.

A link 40 connects each arm with the base of the adjacent frame, each of the said links having an eye or bearing ring 41 at each end, one of the said rings engaging the eye of the adjacent arm 39, and the other engaging an opening in the flange 6 of the base of the adjacent frame. A handle 42 is connected to each arm 28 of the rear arch bar, by means of a bolt and nut 43, and a brace bar 44 is provided for pressing each handle. Each brace bar has an opening at one end engaging the uppermost bolt 36 of the adjacent arm of the arch bar, and at the opposite end each brace is provided with a longitudinally extending series of openings 45. Each handle has an opening for registering with one of the openings of the series, and a bolt 46 is passed through the registering openings for securing the handle thereto. The bolt is passed from within outward, and a nut is engaged with the outer end of each bolt.

A lever 47 is secured to the shaft 38 between the bearings 37, the said lever having a laterally extending arm 48 fitting the periphery of the shaft, and bolts 49 are passed through the shaft in the arm for securing the lever thereto. The lever is provided with the usual latch mechanism 50 coöperating with a toothed quadrant 51 rigid with one of the bearings 37, for holding the lever in adjusted position. It will be evident that by means of the lever the respective frames may be simultaneously swung into the dotted line position of Fig. 3. That is the outer sides of the said frames may be lifted.

In operation, the improved harrow and cultivator is drawn through the field, with the frames on opposite sides of the row. The teeth scratch up the ground removing the weeds and stirring the soil, on both sides of the plants, and close to the said plants. The teeth do not throw a furrow, nor do they throw the dirt any distance from themselves, but merely scratch the same and stir it from the bottom. By means of the lever 47, the respective frames may be adjusted to the inclination of the soil between the rows, and whatever their position they will cultivate at the same depth. Were the frames fixed on a ridge, the outer teeth would cut much deeper than the inner teeth and would most probably uproot some of the plants. With the present construction no dirt is thrown on the plants to break or bend the same, and the cultivation is of sufficient depth to thoroughly eradicate the weeds and to thoroughly stir the soil within limits.

It will be noted that the front arch is of greater height and of greater width than the rear arch, and that the frames are spaced apart a greater distance at their apices than at their bases. In practice, the front arch is approximately eighteen inches in width and twenty-six inches in height, while the rear arch is twelve inches in width and twenty-four inches in height. This arrangement staggers the teeth of the sides 3, so that they do not track each other, and in addition the teeth at the front ends of the frames cultivate the ground at a greater distance from the plants than do the rear teeth. This provides for a gradual approach of the cultivating mechanism to the plants, so that there is no danger of uprooting the plants or of throwing dirt on them. In a certain character of soil when a warm sun follows a rain, a hard crust forms on the surface. Were the teeth at the front of the frames close to the plant, there would be a great probability of their disturbing a large area of crust sufficient to injure the plant. With the present arrangement however, this cannot occur, since should the front teeth stir up a large area of crust, it will be broken gradually to pieces by the following teeth. The arrangement permits a cultivation very similar to that of a series of cultivation, each of which would be a little nearer the plants than the preceding.

When plowing on opposite sides of the ridge, the arrangement of the teeth provides for a gradual pulling down of the ridge, moving the earth away from the plants toward the tongue between the rows. The arrangement also permits the ready cleaning of the teeth, so that but very little litter may be collected on the teeth.

It will be evident that when cultivating plants in a ridge, the front teeth will be well down on the ridge, while each succeeding tooth will approach somewhat nearer to the plants, thus gradually leveling the soil. The wide arch at the front also permits the cultivator to be easily guided by the operator.

In the embodiment of the invention shown in Figs. 4 and 5, the cultivating frames, designated generally by the reference character 52 are of precisely the same construction as the frames shown in Figs. 1 and 2, and the teeth 8 are connected to the frames in precisely the same manner, by means of the clips or staples 12. The cultivating frames are connected by a front arch consisting of a body 53 and arms 54, and by a rear arch consisting of a body 55 and arms 56. The arms 54 and 56 of the respective arches are provided with bearings at their lower ends, which are received between spaced pairs of lugs 57 on the inner side members of the frames, and bolts and nuts 58 are passed through the lugs and the bearings, to hinge the arms to the frames. The arches are connected by a longitudinally extending plate 59, secured at its front end to the under face of the body of the front arch, and secured at its rear end to the under face of the body of the rear arch. A seat 60 is connected with the plate 59 by means of a spring plate 61, and a tongue 62 is pivoted between a pair of spaced lugs 63 on the upper face of the body of the front arch, by means of a bolt and nut 64, the said bolt passing through the lugs and the tongue and being engaged by the nut to prevent displacement thereof.

The frames 52 are adjusted by means of the lever 65 corresponding to the lever 47 of the construction of Figs. 1 to 6, the said lever being secured rigidly to a rock shaft 66, journaled in bearings 67 on the body of the rear arch, and having laterally extending arms 68 at its ends. Links 69 connect the respective arms to the rear member of the adjacent frames 52, in the same manner as described for the construction of Figs. 1 to 6. The frame is provided with the usual latch mechanism 70, coöperating with a toothed quadrant 71 secured to one of the bearings 67.

A plate 72 is secured to the upper face of the plate 59 intermediate the seat and the connection of the tongue, and the said plate is provided at each of its side edges with an upstanding bracket 73 and 73ª. Levers 74 and 75 are pivoted to the respective brackets 73 and 73ª intermediate the ends of the levers, and the upper end of each bracket is rounded on an arc having the pivotal connection of the adjacent lever as its center, and is provided with teeth, for engagement by latch mechanism 76 on the adjacent lever for holding the lever in adjusted position.

One end of a link 77 is pivoted to the lower end of the lever 74, and the other end of the link is forked to engage opposite sides of an arm 78 extending radially from the center of the rock shaft 79 journaled in bearing staples 80 on the plate 59 adjacent to the front arch, and the arms of the fork are pivoted to the arm 78 by means of a bolt and nut 81. The rock shaft is provided at its opposite end with arms 82, for a purpose to be presently described, and a link 83 connects the lower end of the lever 75 with the lever 65, in such manner that when the lever 75 is moved forwardly the lever 65 will be moved rearwardly.

A sectional bearing 84 is secured to the under face of the plate 59 below the connection of the spring plate 61, and the body 85 of an arched axle is journaled in the said bearing. The spindles 86 of the said axle are offset from the body and connected thereto by arms 87, and wheels 88 are journaled on the spindles, the said wheels being retained on the spindles in any suitable manner, as for instance by the pins 89. Collars 90 are journaled on the spindles on the inner side of the wheels, and links 91 connect the collars with the arms 82 of the rock shaft 79, in such manner that when the lever 74 is swung, the body 85 of the axle will be moved angularly with respect to the staple 86, whereby to raise and lower the frames 52 with respect to the wheels. When the arms 87 of the axle are vertical, as shown in Fig. 7, the teeth 8 of the frames 52 will be held out of contact with the ground, while when the said arms are inclined, the frames and the teeth will be lowered to engage the ground.

A draft bar 92 is connected with the front end of each frame, by means of bolts and nuts 93, and draft mechanism indicated at 94 may be connected with the front ends of the said draft bars. The frames 52 are arranged in precisely the same manner with respect to each other as are the frames shown in the construction of Figs. 1 to 5, that is with the adjacent side members closer at the rear of the frame than at the front thereof. This arrangement is due to the fact that the front arch bar has a longer body than the rear arch bar. The arms 54 of the front arch bar are also of greater length than the arms 56 of the rear arch bar.

The mechanism so far as concerns the cultivating devices, and the connecting frame, and the adjustment for the cultivating frames, as well as the draft mechanism, is precisely the same in the sulky or riding cultivator as in the walking cultivator. The only difference between the riding or sulky cultivator and the walking cultivator, is the provision of the seat, the axle and the wheels, the adjusting mechanism for the wheels, and the connection between the lever 75 and the lever 65. The tongue 62 is necessary with the riding or sulky cultivator, because of the fact that the handles are omitted. In the walking cultivator the cultivator is guided by the operator who holds the handles, while the sulky or riding cultivator is guided by the draft animals.

In Fig. 4 is shown knives or scrapers, each consisting of a blade 95 and a shank 96 which are used instead of the rearmost teeth on the inner side members of the frames. The shanks 96 of the knives or scrapers are shaped in the same manner as the shank of the teeth, and are connected to the frames by the clips 12 in the same manner as the teeth are connected. The said blades are curved slightly inwardly at their rear ends, as shown in Fig. 5, and by means of the said blades or scrapers the soil may be cultivated somewhat closer to the plant, and also somewhat deeper at this point if desired, since the lower edges of the said blades are arranged slightly below the ends of the teeth. The said knives or scrapers may be used in the construction of Figs. 1 to 5 if desired, and while they are shown set deeper, they may be adjusted upwardly or downwardly to run any desired depth. In addition, by twisting the shank in the clip, the free ends of the blades may be brought nearer to or farther away from the plant to cultivate closer or farther away as may be desired. The principal object of the blades or scrapers is to move the soil toward or from the plants as may be desired.

The operation of the construction shown in Figs. 4 and 5 is precisely the same as that shown in Figs. 1 to 3, so far as the cultivation of the plants is concerned. Without any radical changes the walking cultivator may be transformed into a riding or sulky cultivator, since all of the mechanism is detachable. The sectional bearing 84 is connected to the plate 59 by bolts and nuts 97, and the plate 72 is also connected to the said plate 59 by bolts and nuts 98. The rock shaft 79 is journaled in bearing staples 80, as before mentioned, and the said staples are passed through a bearing plate 99 arranged on the upper face of the plate 59 and through the said plate 59, and are engaged by nuts 100 below the said plate 59. The seat supporting spring 61 is also detachable from the plate 59. In practice however, the improved cultivators would be marketed in two distinct types, as riding or sulky cultivators and as walking cultivators.

I claim:

1. A cultivator comprising a plurality of triangular frames, each comprising a base and sides, a series of teeth detachably connected with each frame, front and rear arch bars for connecting the frames, each arch bar comprising a body extending transversely between the frames, and arms pivoted to the adjacent sides of the frames, the body of the front arch being of greater length than the body of the rear arch to space the frames a greater distance at their apices than at their bases, a shaft journaled on the body of the rear arch bar and having rearwardly extending crank arms at its ends, a link connecting each arm with the base of the adjacent frame, a lever secured to the shaft for oscillating the same, means for holding the lever in adjusted position, and a plate connecting the bodies of the arch bars.

2. A cultivator comprising a plurality of substantially triangular frames, front and rear arch bars for connecting the frames, each arch bar comprising a body extending transverse to the frames, and arms extending approximately perpendicular to the plane of the frames, a hinge connection between each arm of each arch bar and the adjacent frame at the inner side of the frame for permitting the outer side of the frame to be raised and lowered, a rigid connection between the bodies of the arch bars, a shaft journaled on the rear arch bar longitudinally of the body thereof and extending beyond the arms, said shaft having at each end a lateral arm, a link connecting each arm to the adjacent frame and means for oscillating the shaft and for holding it in adjusted position, a handle connected to each arm of the rear arch bar near its connection with the adjacent frame, a bar connected at one end to each arm of the rear arch bar, and an adjustable connection between each handle and the adjacent bar.

3. A cultivator comprising a plurality of substantially triangular frames, front and rear arch bars for connecting the frames, each arch bar comprising a body extending transverse to the frames and arms extending approximately perpendicular to the plane of the frames, a hinge connection between each arm of each arch bar and the adjacent frame at the inner side of the frame for permitting the outer side of the frame to be raised and lowered, a rigid connection between the bodies of the arch bars, a shaft journaled on the rear arch bar longitudinally of the body thereof and extending beyond the arms, said shaft having at each end a lateral arm, a link connecting each arm to the adjacent frame, means for oscillating the shaft and for holding it in adjusted position, and means supported by the rear arch bar for raising and lowering the outer edges of the frame.

4. A cultivator comprising a plurality of substantially triangular frames, front and rear arch bars for connecting the frames, each arch bar comprising a body extending transverse to the frames and arms extending approximately perpendicular to the plane of the frames, a hinge connection between each arm of each arch bar and the adjacent frame at the inner side of the frame for permitting the outer side of the frame to be raised and lowered, and a rigid connection between the bodies of the arch bars.

CHARLIE F. DAVIS.

Witnesses:
  C. R. HARRYMAN,
  C. M. CRAWFORD.

---

Copies of this patent may be obtained for five cents each, by addressing the "Commissioner of Patents, Washington, D. C."